United States Patent
Cai et al.

(10) Patent No.: US 11,574,456 B2
(45) Date of Patent: Feb. 7, 2023

(54) PROCESSING IRREGULARLY ARRANGED CHARACTERS

(71) Applicant: International Business Machines Corporation, Armonk, NY (US)

(72) Inventors: Zhuo Cai, Beijing (CN); Jian Dong Yin, Beijing (CN); Wen Wang, Beijing (CN); Rong Fu, Ningbo (CN); Hao Sheng, Ningbo (CN); Kang Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 217 days.

(21) Appl. No.: 16/594,127

(22) Filed: Oct. 7, 2019

(65) Prior Publication Data
US 2021/0103750 A1    Apr. 8, 2021

(51) Int. Cl.
G06V 10/24    (2022.01)
G06N 3/04    (2006.01)
G06V 30/28    (2022.01)

(52) U.S. Cl.
CPC .............. *G06V 10/242* (2022.01); *G06N 3/04* (2013.01); *G06V 30/287* (2022.01)

(58) Field of Classification Search
CPC ... G06K 9/3208; G06K 2209/011; G06N 3/04
See application file for complete search history.

(56) References Cited

U.S. PATENT DOCUMENTS

| 8,805,080 B2 | 8/2014 | Sun et al. |
| 8,977,042 B2 * | 3/2015 | Huo ......................... G06K 9/42 |
| | | 382/161 |
| 10,671,878 B1 * | 6/2020 | Sarshogh ............. G06K 9/6262 |
| 2018/0150689 A1 * | 5/2018 | Kimura .............. G06V 10/7557 |

OTHER PUBLICATIONS

Long et al., "Scene Text Detection and Recognition: The Deep Learning Era", arXiv:1811.04256v3, Dec. 22, 2018, 20 pages.
Bania et al., "Handwritten Assamese Character Recognition using Texture and Diagonal Orientation features with Artificial Neural Network", International Journal of Applied Engineering Research, vol. 13, No. 10 (2018), pp. 7797-7805.
Dileep, D., "A Feature Extraction Technique Based on Character Geometry for Character Recognition", arXiv, 2012, 4 pages.
Mell et al., "The NIST Definition of Cloud Computing", Recommendations of the National Institute of Standards and Technology, Sep. 2011, 7 pages.

* cited by examiner

*Primary Examiner* — Jianxun Yang
(74) *Attorney, Agent, or Firm* — James L. Olsen

(57) ABSTRACT

Aspects of the present disclosure relate to processing irregularly arranged characters. An image is received. An irregularly arranged character within the image is detected. A direction of the irregularly arranged character is modified to a proper direction to obtain a properly oriented character. The properly oriented character is recognized to obtain a first identified character. The image is then rebuilt by replacing the irregularly arranged character with the first identified character, the first identified character in a machine-encoded format.

14 Claims, 7 Drawing Sheets

PROCESSING IRREGULARLY ARRANGED CHARACTERS

BACKGROUND

The present disclosure relates generally to the field of text processing, and more specifically, to processing irregularly arranged characters.

SUMMARY

Embodiments of the present disclosure relate to a method, computer program product, and system for processing irregularly arranged characters. An image can be received. An irregularly arranged character within the image can be detected. A direction of the irregularly arranged character can be modified to a proper direction to obtain a properly oriented character. The properly oriented character can be recognized to obtain a first identified character. The image can then be rebuilt by replacing the irregularly arranged character with the first identified character, the first identified character in a machine-encoded format.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
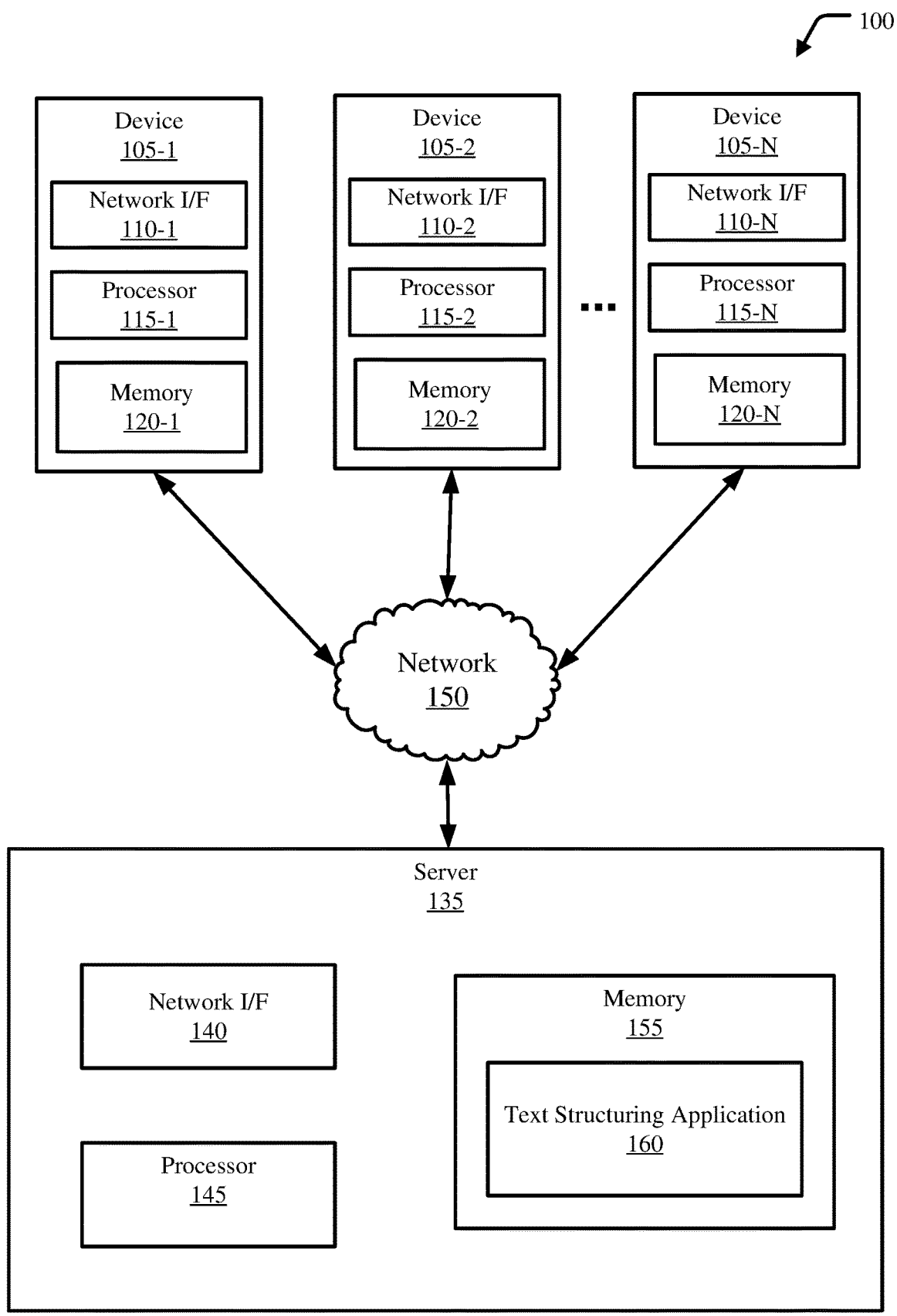
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of text processing, and more specifically, to processing irregularly arranged characters. While the present disclosure is not necessarily limited to such applications, various aspects of the disclosure can be appreciated through a discussion of various examples using this context.

Optical character recognition (OCR) is performed to convert images of typed, handwritten, and/or printed text into a machine-encoded format. Text is converted into a machine-encoded format such that it can be electronically edited, searched, stored, displayed, and/or used in machine processes (e.g., machine learning). Currently, OCR is optimized to recognize text on a line-by-line basis. This is because, in lines of characters, characters are all oriented in the correct direction, and current OCR technologies are trained with characters oriented in the correct direction. OCR has difficulty recognizing irregularly arranged characters (e.g., scrambled characters, characters oriented in arbitrary directions and/or arbitrary positions) within images, handwritten documents, and printed work.

Aspects of the present disclosure address the aforementioned complications via a text structuring system. The text structuring system can be configured to receive an image containing an irregularly arranged character. The irregularly arranged character can be detected. A direction of the irregularly arranged character can be modified to a proper direction. The character can then be recognized. The input image can then be rebuilt by replacing the irregularly arranged character with a corresponding character in machine-encoded format.

Aspects of the present disclosure provide several advantages. First, irregularly arranged characters within images can be successfully processed (e.g., recognized, reformatted, etc.) using the methods disclosed herein, whereas conventional OCR algorithms have difficulty processing irregularly arranged characters. By performing direction modification prior to recognition, less time is required to train the recognition algorithm and more accurate recognition is attained. Additionally, the formerly unstructured text within the image can be converted to a format where the text can be readily searched, stored, edited, displayed, and/or used in machine processes (e.g., ingested using data mining techniques and/or used as training data for machine learning).

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, or other input device), and/or any commercially available or custom software (e.g., browser software, communications software, server software, natural language processing software, search engine and/or web crawling software, image processing software, OCR software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 6.

The server 135 includes a text structuring application 160. The text structuring application 160 can be configured to recognize and process irregularly arranged characters. To do so, the text structuring application 160 can be configured to receive unstructured textual data (e.g., an image with irregularly arranged characters) and detect (e.g., using an object detection algorithm) individual characters within the unstructured textual data. The text structuring application 160 can then be configured to modify the direction of each irregularly arranged character within the textual data such that the irregularly arranged characters are properly oriented. Upon orienting the characters, recognition can be performed on each character. This can be completed such that the image containing the characters can be rebuilt with structured characters (e.g., machine encoded text) corresponding to the irregularly arranged characters. The text structuring application 160 can then be configured to transmit the machine-encoded text to a user.

As referenced herein, "machine-encoded text" refers to text which is digitized such that it can be ingested and processed by a computer system. An example of a machine-encoded text format is the American Standard Code for Information Interchange (ASCII), a format where alphabetic, numeric, or special characters are represented with a 7-bit binary number. Other examples of machine-encoded text include Unicode and Extended Binary Coded Decimal Interchange Code (EBCDIC).

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
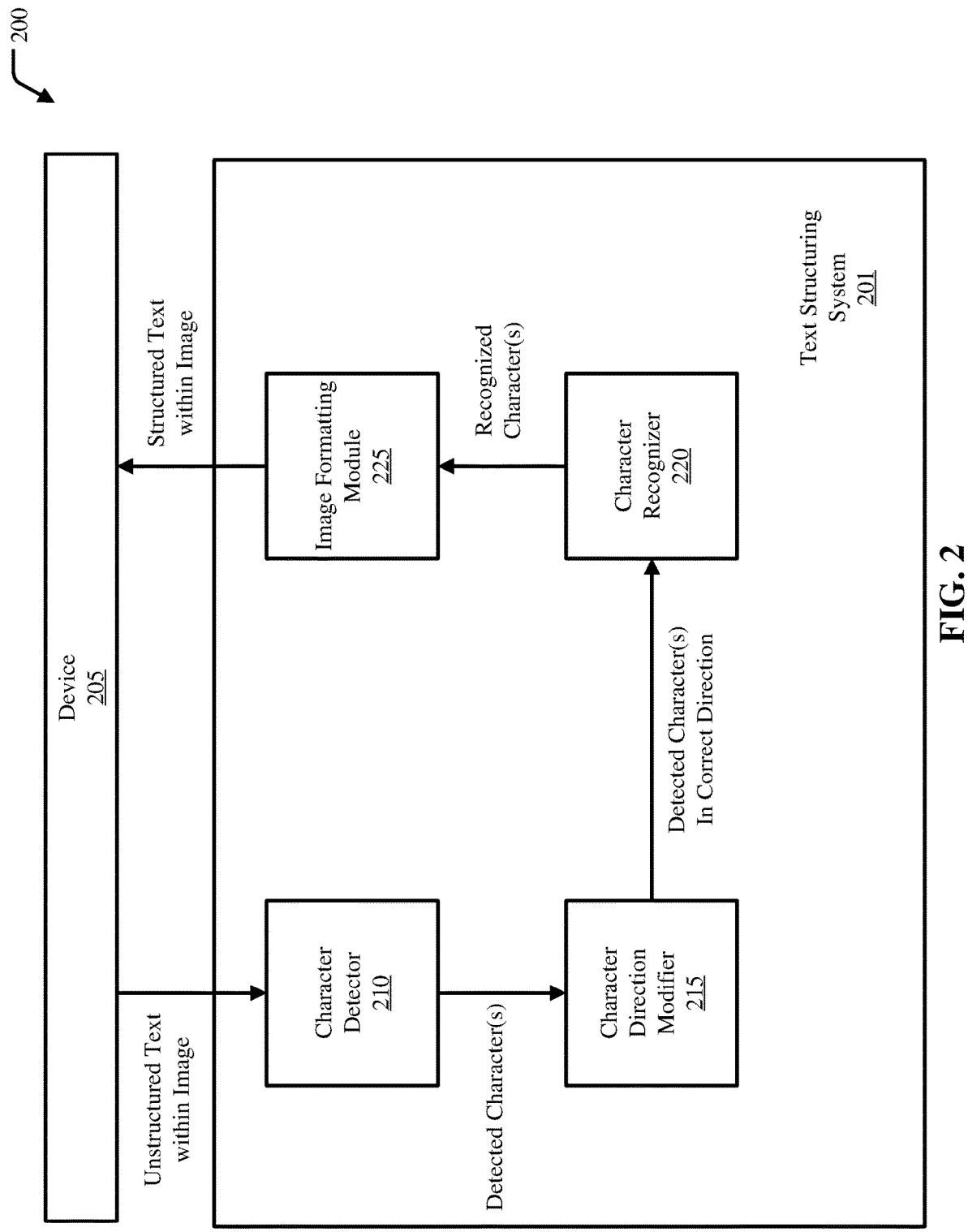
FIG. 2 is a block diagram illustrating an example computing environment including a text structuring system, in accordance with embodiments of the present disclosure.

Turning now to FIG. 2, illustrated is a block diagram of an example computing environment 200 in which illustrative embodiments of the present disclosure can be implemented. The computing environment 200 includes a device 205 and a text structuring system 201. The text structuring system 201 includes a character detector 210, a character direction modifier 215, a character recognizer 220, and an image formatting module 225. In embodiments, the character detector 210, character direction modifier 215, character recognizer 220, and image formatting module 225 can be processor executable instructions that can be executed by a dedicated or shared processor using received inputs (e.g., from device 205).

Consistent with various embodiments, the character detector 210 can be configured to receive an image containing unstructured text. The image can be in any suitable format (e.g., .jpeg, .tiff, .pdf, etc.). In embodiments, the character detector 210 can be configured to perform pre-processing techniques on the received image. For example, the character detector can be configured to perform the following pre-processing techniques: binarization (e.g., conversion of grayscale to black and white), character isolation (e.g., breaking merged characters due to image artifacts into individual characters), de-skewing (adjusting image alignment), line removal, layout analysis (e.g., identifying columns, rows, paragraphs, lines, words etc.), script recognition, and/or normalization of aspect ratio and/or scale. Pre-processing techniques can enhance and/or enable character recognition. In embodiments, the type and/or number of applied pre-processing techniques depends on the implemented processing algorithms (e.g., for character detection and recognition) and/or the state of the input data (e.g., the format, color scheme, artifacts present within, etc.).

The character detector 210 can then be configured to detect a character within the image. As discussed herein, "detection" refers to ascertaining the presence (i.e., existence) of a character within the image. In embodiments, detection can also include ascertaining a location of the character within the image. Detection does not necessarily indicate that the character is recognized (identified) but may merely indicate that a character is present.

The character detector 210 can detect a character within the image in any suitable manner. In embodiments, the character detector 210 utilizes a machine learning or deep learning based object detection algorithm to detect characters. These include, for example, histogram of oriented gradients (HOG) features, scale-invariant feature transform (SIFT), Viola-Jones, region-based neural networks (e.g., region-based convolutional neural network (R-CNN), Fast R-CNN, Faster R-CNN), single shot multibox detector (SSD) and you only look once (YOLO).

In embodiments, the output of the character detector 210 includes a location of a character. The location can be represented in any suitable manner. For example, the location of the detected character can be expressed as pixel coordinates within an image, dimensional coordinates within a grid, etc. The location can be used to reconstruct the input image with editable text. For example, the location of the character can be used to delete an unstructured character and replace the unstructured character with a corresponding character in machine readable format.

In embodiments, the character detector 210 is configured to extract (e.g., isolate, separate) a detected character from the image. This can be completed such that image processing techniques can be applied solely on the character of interest, rather than the entire image.

Detected characters (which may be isolated) are then transmitted to the character direction modifier 215. The character direction modifier 215 can be configured to modify a direction of the detected character to a proper direction to obtain a properly oriented character. This can be completed using a machine learning model configured to recognize the proper direction of various characters. For example, a model can be trained to recognize a character in 360 degrees and can be configured to modify the orientation of the character to a proper direction based on the current orientation of the character. In some embodiments, morphological features (e.g., lines, loops, curves, etc.) can be used to modify a direction of a character. For example, based on the typical placement (e.g., physical position and direction) of morphological features within a particular character, the character can be modified and readjusted such that the morphological features are placed in a correct position. In some embodiments, the character direction modifier 215 can be configured to determine that a character does not require direction adjustment.

Upon adjusting a direction of the detected characters (if applicable), detected characters in the correct direction are transmitted to the character recognizer 220. The character recognizer 220 can be configured to recognize the characters. This can be performed after direction modification to reduce the training time of the recognition module and also to reduce noise such that recognition can be performed more accurately. Recognition can be performed in any suitable manner, including machine learning and deep learning algorithms. Algorithms which can be used to recognize characters include DenseNet (dense convolutional network), residual neural network (Resnet), linear discriminant analysis, clustering, nearest neighbor classifiers (e.g., k-nearest neighbors algorithm), Naïve Bayes, convolutional neural networks (CNNs), pattern matching, feature detection, and others. The character recognizer 220 then outputs the identity of each character to the image formatting module 225.

The image formatting module 225 is then configured to reconstruct the input image with machine readable text. In embodiments, each detected character in the input image is erased (e.g., the pixels of the characters are altered) and replaced with a corresponding machine-encoded character. The machine-encoded characters can be placed in the position of the deleted unstructured characters by referencing their respective locations (e.g., determined by the character detector 210). In embodiments, the image can be reconstructed (e.g., the pixels of any non-characters can be copied) and the machine-encoded characters can be placed in their respective locations. The image formatting module 225 then outputs the image with machine-encoded text to the device 205.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary. For example, in some embodiments, the character structuring system 201 may not include structured input data, as the character structuring system 201 may not be configured to combine structured and unstructured data.

Figure 3:
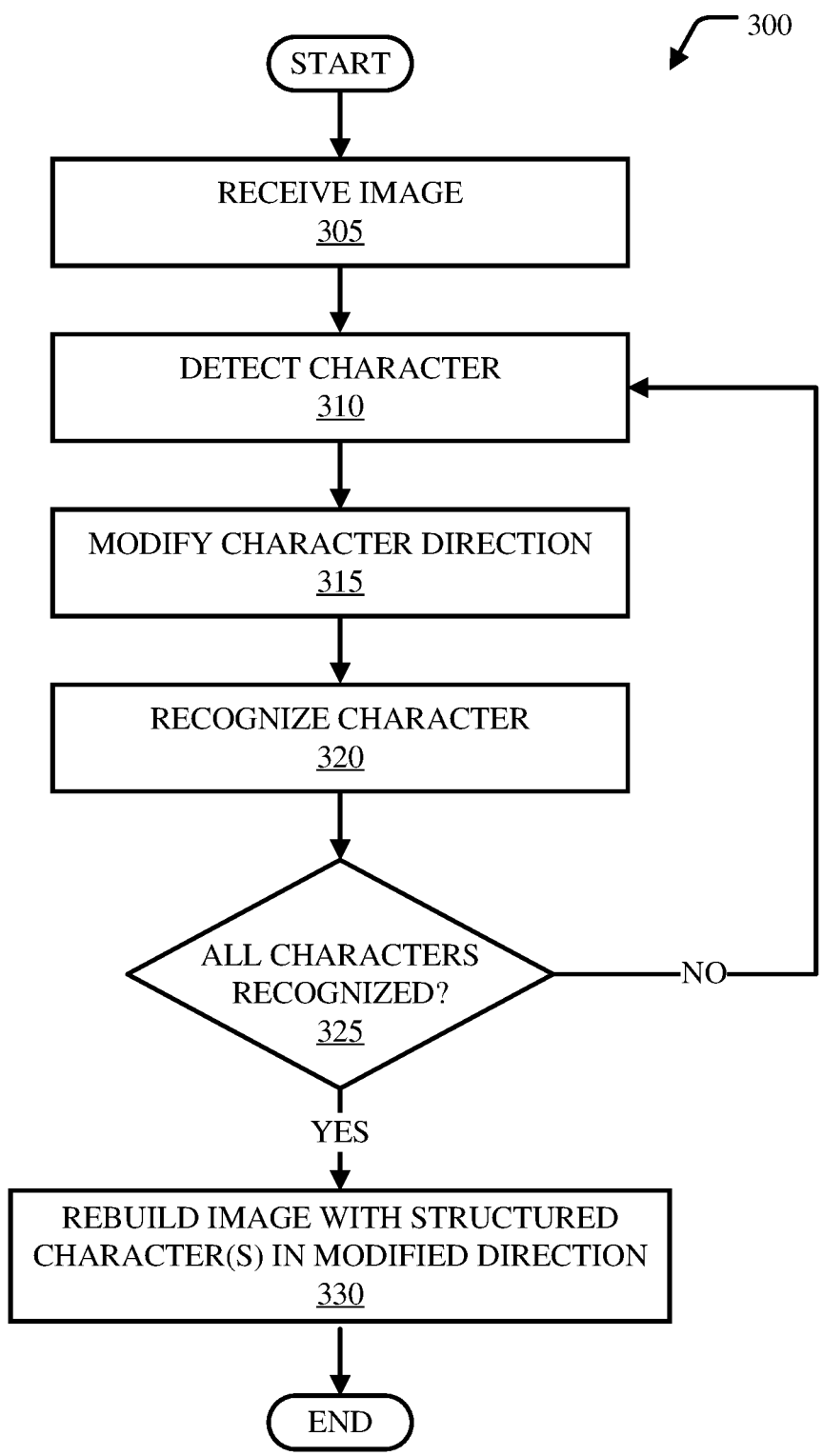
FIG. 3 is a flow-diagram illustrating an example method for rebuilding an input image containing irregularly arranged characters, in accordance with embodiments of the present disclosure.

FIG. 3 is a flow diagram illustrating an example method 300 for formatting characters within an image containing irregularly arranged characters, in accordance with embodiments of the present disclosure. Method 300 initiates at operation 305, where an image is received. The image can be received in any suitable manner, including wired and/or wireless networks. The image can be in any suitable format. In some embodiments, the image can be pre-processed upon receipt (e.g., using any pre-processing techniques described with respect to FIG. 2.).

A character is then detected within the image. This is illustrated at operation 310. The character can be detected using an object detection algorithm, such as the object detection algorithms described with respect to the character detector 210 of FIG. 2. In embodiments, detection can include ascertaining the presence of the character. In embodiments, detection can further include ascertaining a location of the character. In some embodiments, upon detection, the character can be isolated (e.g., the pixels corresponding to the character can be extracted from the image).

A direction of the character is then modified. This is illustrated at operation 315. The direction of the character can be modified using the same, or substantially similar techniques, with respect to the character direction modifier 215 of FIG. 2. For example, the character direction can be modified based on a model built on training data and/or using morphological features of the character.

The character is then recognized. This is illustrated at operation 320. The character can be recognized using the same, or substantially similar, techniques described with respect to the character recognizer 220 of FIG. 2. For example, DenseNet or Resnet algorithms can be used to identify the character.

A determination is then made whether all characters in the image are recognized. This is illustrated at operation 325. If one or more characters are still not recognized, then these characters can be detected at operation 310. In some embodiments, if one or more characters have already been detected but were not properly oriented, these characters can have their directions modified at operation 315.

If a determination is made that all characters in the image are recognized, then the input image is rebuilt with the characters in the modified direction. This is illustrated at operation 330. In embodiments, rebuilding the input image can include erasing (i.e., deleting) the unstructured characters and replacing them with corresponding machine-encoded text characters in the proper direction. In embodiments, rebuilding the input image can include copying the pixels of the non-characters and placing (i.e., pasting) corresponding machine-encoded text characters at locations corresponding to the unstructured characters. Upon rebuilding the image with machine-encoded characters, method 300 ends.

The aforementioned operations can be completed in any order and are not limited to those described. Additionally, some, all, or none of the aforementioned operations can be completed, while still remaining within the spirit and scope of the present disclosure.

Figure 4:
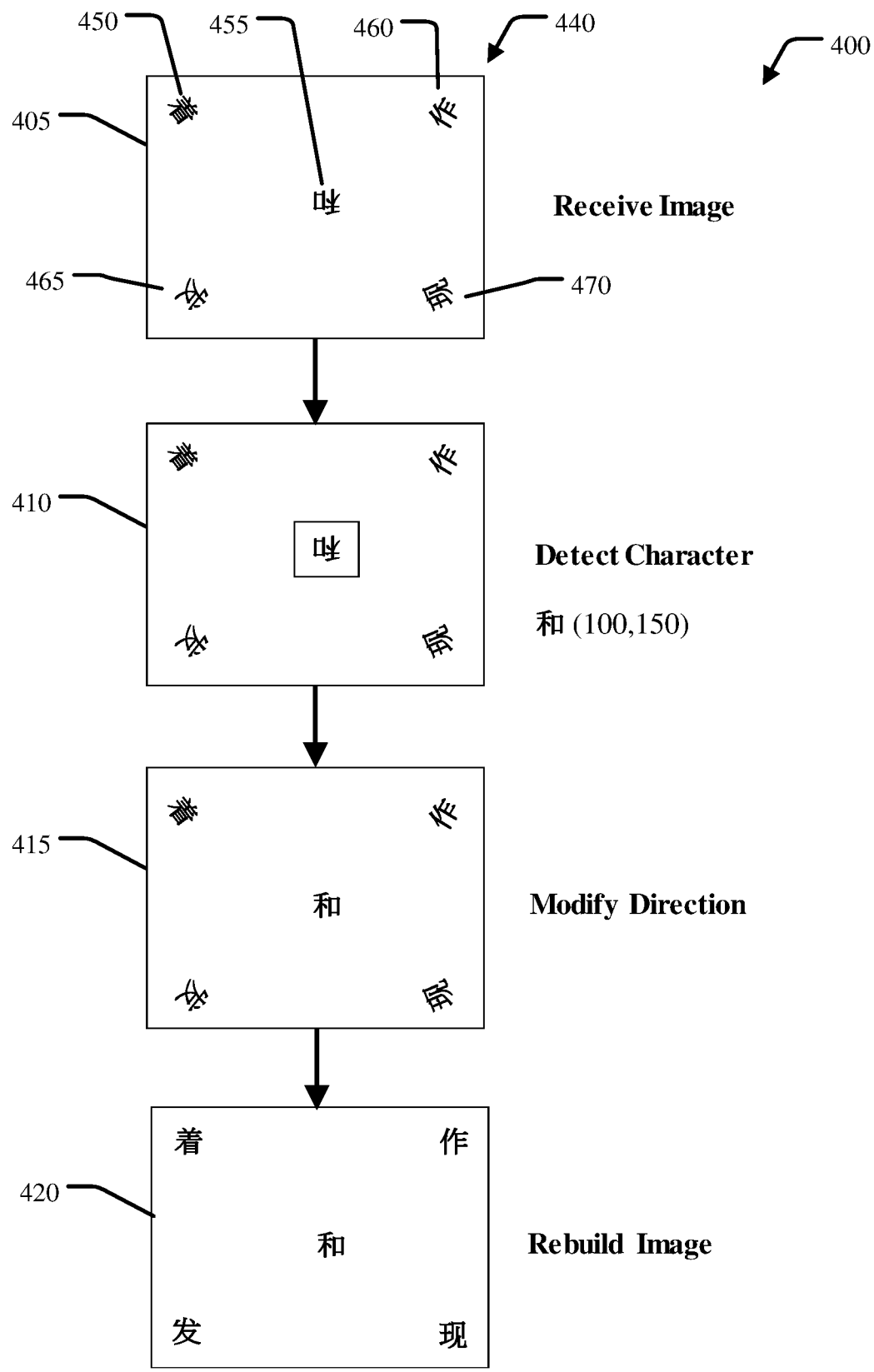
FIG. 4 is a diagram illustrating a process for rebuilding an image containing irregularly arranged characters, in accordance with embodiments of the present disclosure.

FIG. 4 is a diagram illustrating a process 400 for rebuilding an input image with machine-encoded text, in accordance with embodiments of the present disclosure.

The process 400 initiates at operation 405, where an image 440 is received. The image 440 includes a rectangular box having a first character 450 in the upper left corner, a second character 455 in the middle, a third character 460 in the upper right corner, a fourth character 465 in the bottom left corner, and a fifth character 470 in the bottom right corner.

The second character 455 is then detected at operation 410. In this example, a bounding box is drawn around the second character 455 indicating the ascertainment of its presence within the image 440. In embodiments, the second character 455 can then be extracted from this image 440. In this example, the coordinates (indicating location) of the second character 455 (100, 150) are also determined.

The direction of the second character 455 is then modified. This is illustrated at operation 415. In embodiments, the direction of the second character 455 can be modified using a machine learning, deep learning, and/or feature based model. As depicted in FIG. 4, the direction of the second character 455 is modified from upside down (an irregular orientation) to right-side up (a proper orientation).

The image 440 is then rebuilt with machine-encoded characters in the proper direction. This is illustrated at operation 420. In embodiments, upon direction modification, each character is recognized. Thereafter, each character can be replaced with a corresponding machine encoded character (e.g., an ASCII character). Each character can be modified in substantially the same manner as the second character 455. As shown in FIG. 4, the first character 450, second character 455, third character 460, fourth character 465, and fifth character 470 are replaced with machine-encoded versions in the proper direction.

By reformatting characters within the image 440, future users can more easily understand the image 440. Further, text within the image 440 can be readily stored, searched, edited, displayed, and/or used in machine processes (e.g., ingested using data mining techniques and/or used as training data for machine learning). Further still, future OCR can be performed more accurately on the image 440. Where conventional OCR algorithms would have difficulty processing the characters within the image 440, aspects of the present disclosure can successfully process the irregularly arranged characters.

Figure 5:
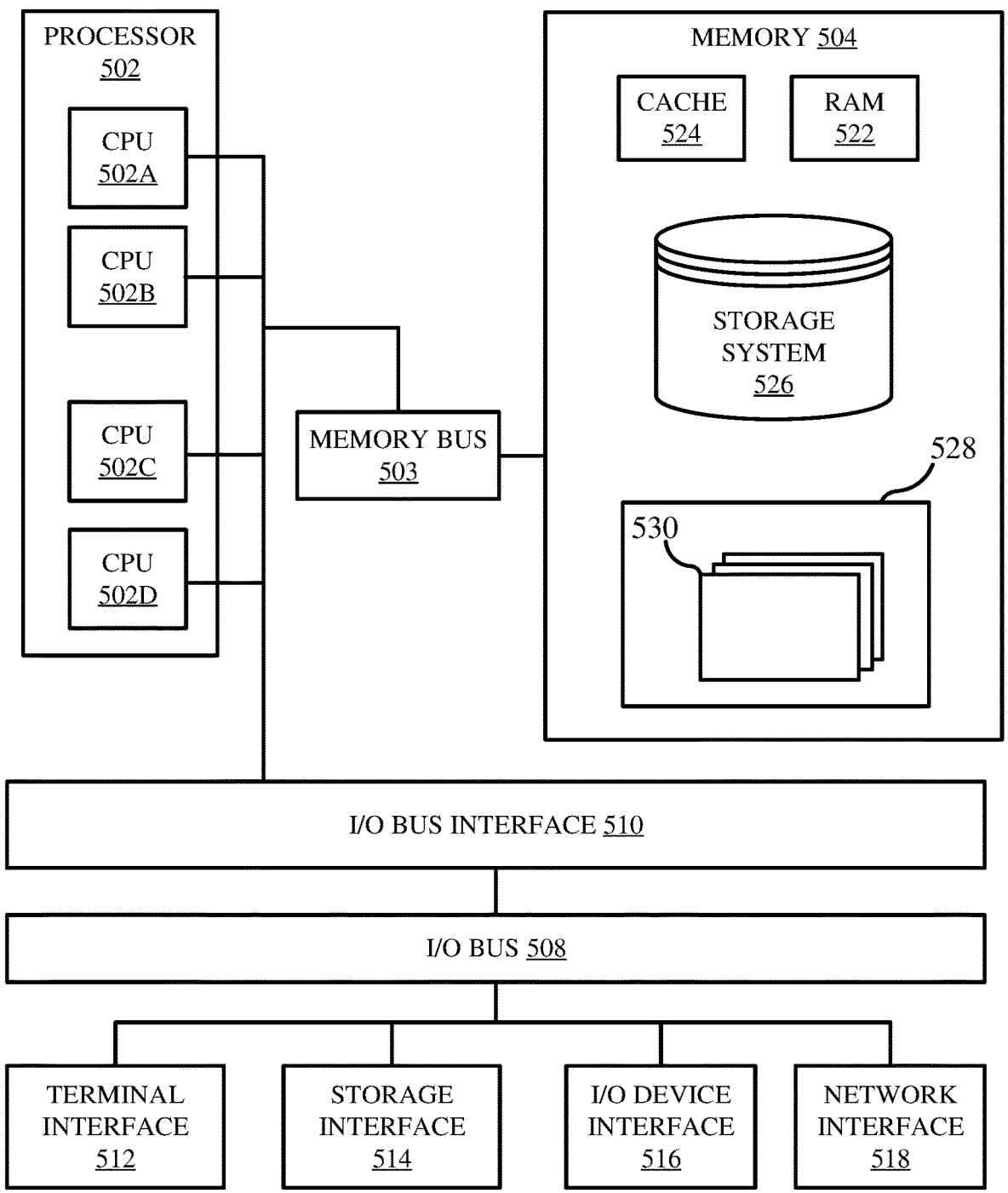
FIG. 5 is a high-level block diagram illustrating an example computer system that can be used in implementing one or more of the methods, tools, and modules, and any related functions described herein, in accordance with embodiments of the present disclosure.

Referring now to FIG. 5, shown is a high-level block diagram of an example computer system 501 that may possibly be utilized in various devices discussed herein (e.g., devices 105, server 135, device 205, text structuring system 201) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502 (also referred to as processors herein), a memory 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random-access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

In some embodiments, the program modules 530 of the computer system 501 include a text structuring module. The text structuring module can be configured to receive an image. The text structuring module can be configured to detect an irregularly arranged character within the image. A direction of the irregularly arranged character can be modified to a proper direction. The character can then be recognized. Upon recognizing the character, the text structuring module can be configured to rebuild the input image with a machine-encoded character replacing the irregularly arranged character.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
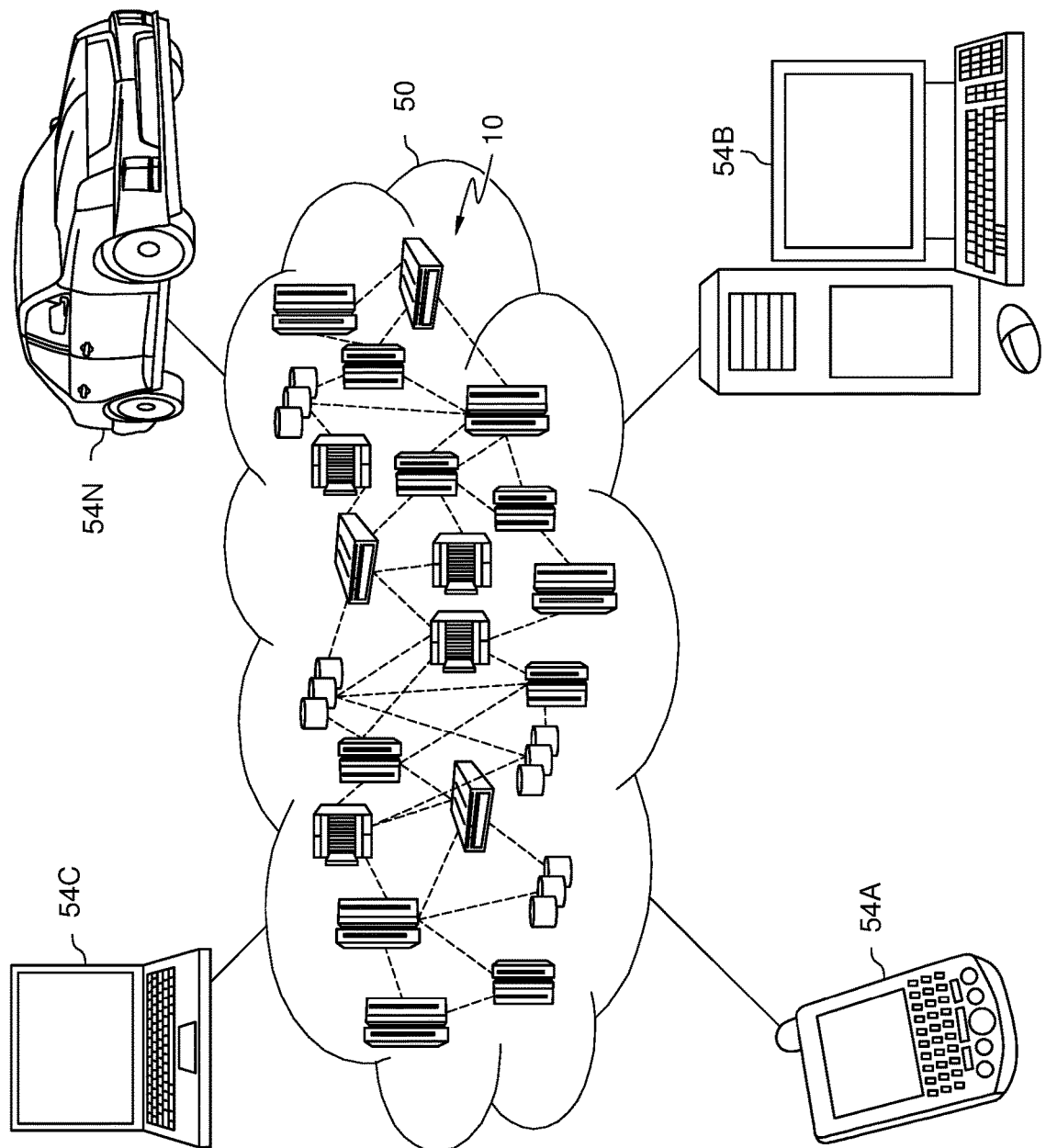
FIG. 6 is a diagram illustrating a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105, device 205), desktop computer 54B (e.g., server 135, text structuring system 201), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 600A-N shown in FIG. 6 are intended to be illustrative only and that computing nodes 10 and cloud computing environment 50 can communicate with any type of computerized device over any type of network and/or network addressable connection (e.g., using a web browser).

Figure 7:
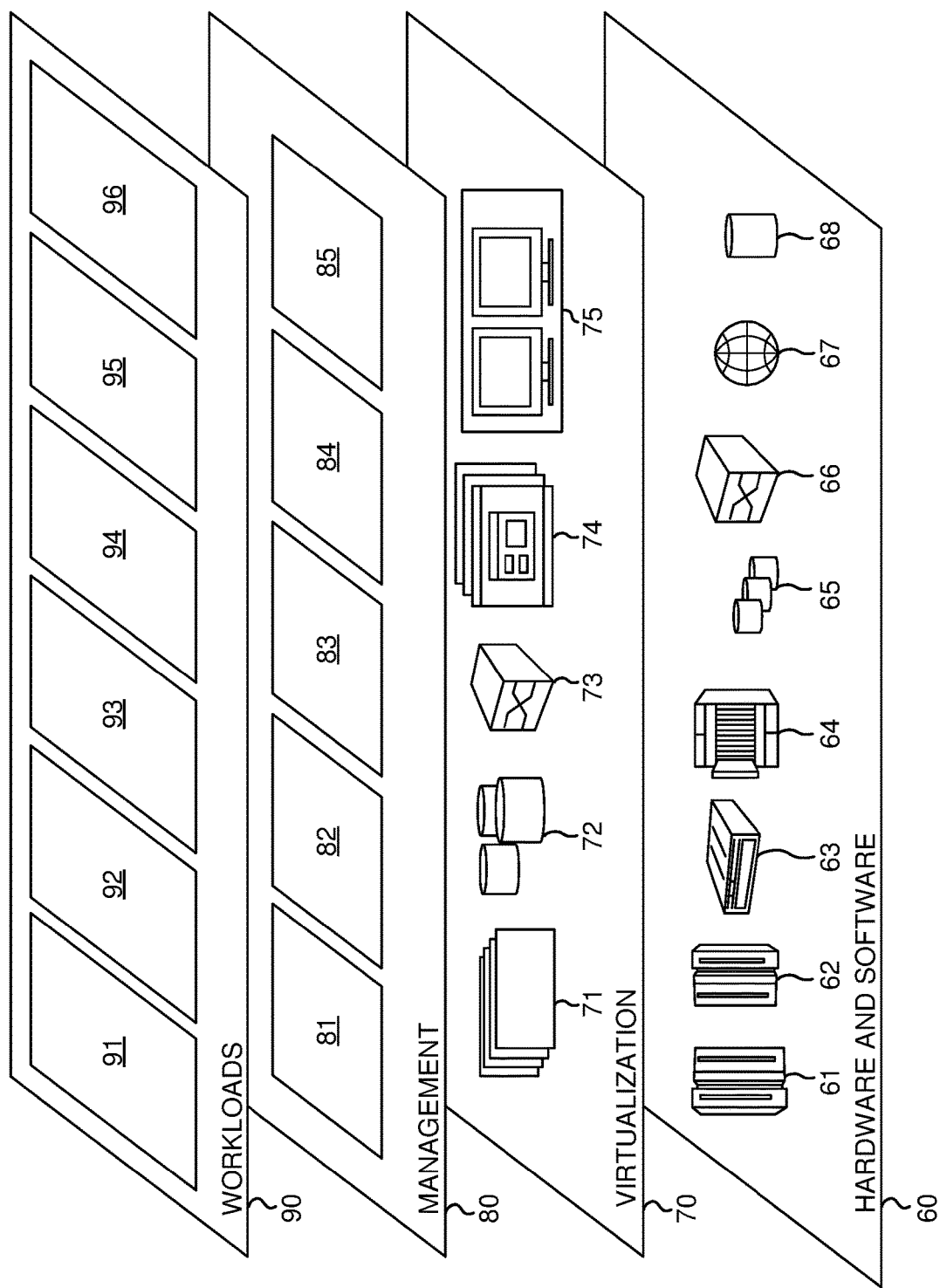
FIG. 7 is a block diagram illustrating abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text structuring 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    receiving, by a processor, an image;
    detecting a first irregularly arranged character within the image;
    determining a first set of pixel coordinates of the first irregularly arranged character within the image;
    modifying a direction of the first irregularly arranged character to a proper direction to obtain a first properly oriented character;
    recognizing, using a neural network, the first properly oriented character to obtain a first identified character;
    rebuilding the image by replacing the first irregularly arranged character with the first identified character at the determined first set of pixel coordinates at a first time, the first identified character in a machine-encoded format;

detecting a second irregularly arranged character within the image;

determining a second set of pixel coordinates of the second irregularly arranged character within the image;

modifying a direction of the second irregularly arranged character to a proper direction to obtain a second properly oriented character;

recognizing, using the neural network, the second properly oriented character to obtain a second identified character; and rebuilding the image by replacing the second irregularly arranged character with the second identified character at the determined second set of pixel coordinates at a second time, the second identified character in the machine-encoded format.

2. The method of claim 1, wherein the direction of the first or second irregularly arranged character is modified using a morphological feature-based model.

3. The method of claim 1, wherein the first or second irregularly arranged character is detected using a region-based convolutional neural network.

4. The method of claim 1, wherein the properly oriented character is recognized using a dense convolutional network.

5. The method of claim 1, wherein prior to modifying the direction of the first or second irregularly arranged character, the irregularly arranged character is extracted from the image.

6. A computer program product comprising a computer readable storage medium having program instructions embodied therewith, the program instructions executable by a processor to cause the processor to perform a method comprising:

receiving an image;

detecting a first irregularly arranged character within the image;

determining a first set of pixel coordinates of the first irregularly arranged character within the image;

modifying a direction of the first irregularly arranged character to a proper direction to obtain a first properly oriented character;

recognizing, using a neural network, the first properly oriented character to obtain a first identified character;

rebuilding the image by replacing the first irregularly arranged character with the first identified character at the determined first set of pixel coordinates at a first time, the first identified character in a machine-encoded format;

detecting a second irregularly arranged character within the image;

determining a second set of pixel coordinates of the second irregularly arranged character within the image;

modifying a direction of the second irregularly arranged character to a proper direction to obtain a second properly oriented character;

recognizing, using the neural network, the second properly oriented character to obtain a second identified character; and rebuilding the image by replacing the second irregularly arranged character with the second identified character at the determined second set of pixel coordinates at a second time, the second identified character in the machine-encoded format.

7. The computer program product of claim 6, wherein the direction of the first or second irregularly arranged character is modified using a morphological feature-based model.

8. The computer program product of claim 6, wherein the first or second irregularly arranged character is detected using a region-based convolutional neural network.

9. The computer program product of claim 6, wherein the properly oriented character is recognized using a dense convolutional network.

10. The computer program product of claim 6, wherein prior to modifying the direction of the first or second irregularly arranged character, the first or second irregularly arranged character is extracted from the image.

11. A system comprising:

a memory storing program instructions; and a processor, wherein the processor is configured to execute the program instructions to perform a method comprising:

receiving an image;

detecting a first irregularly arranged character within the image;

determining a first set of pixel coordinates of the first irregularly arranged character within the image;

modifying a direction of the first irregularly arranged character to a proper direction to obtain a first properly oriented character;

recognizing, using a neural network, the first properly oriented character to obtain a first identified character;

rebuilding the image by replacing the first irregularly arranged character with the first identified character at the determined first set of pixel coordinates at a first time, the first identified character in a machine-encoded format;

detecting a second irregularly arranged character within the image;

determining a second set of pixel coordinates of the second irregularly arranged character within the image;

modifying a direction of the second irregularly arranged character to a proper direction to obtain a second properly oriented character;

recognizing, using the neural network, the second properly oriented character to obtain a second identified character; and rebuilding the image by replacing the second irregularly arranged character with the second identified character at the determined second set of pixel coordinates at a second time, the second identified character in the machine-encoded format.

12. The system of claim 11, wherein the first or second irregularly arranged character is detected using a region-based convolutional neural network.

13. The system of claim 11, wherein prior to modifying the direction of the first or second irregularly arranged character, the irregularly arranged character is extracted from the image.

14. The system of claim 11, wherein prior to rebuilding the image by replacing the first or second irregularly arranged character with the first identified character, pixels associated with the pixel coordinates of the irregularly arrange character are altered to erase the first or second irregularly arranged character.

* * * * *